(12) United States Patent
Secondini et al.

(10) Patent No.: US 9,485,030 B2
(45) Date of Patent: *Nov. 1, 2016

(54) OPTICAL SIGNAL MODULATION

(71) Applicant: TELEFONAKTIEBOLAGET L M ERICSSON (publ), Stockholm (SE)

(72) Inventors: Marco Secondini, Rome (IT); Fabio Cavaliere, Vecchiano (IT)

(73) Assignee: TELEFONAKTIEBOLAGET LM ERICSSON (publ), Stockholm (SE)

( * ) Notice: Subject to any disclaimer, the term of this patent is extended or adjusted under 35 U.S.C. 154(b) by 52 days.

This patent is subject to a terminal disclaimer.

(21) Appl. No.: 14/526,413

(22) Filed: Oct. 28, 2014

(65) Prior Publication Data

US 2015/0125161 A1 May 7, 2015

Related U.S. Application Data

(63) Continuation of application No. 13/055,126, filed as application No. PCT/EP2008/061881 on Sep. 8, 2008, now Pat. No. 8,903,253.

(30) Foreign Application Priority Data

Jul. 31, 2008 (EP) ..................................... 08161561

(51) Int. Cl.
*H04B 10/04* (2006.01)
*G02F 1/25* (2006.01)
(Continued)

(52) U.S. Cl.
CPC .............. *H04B 10/541* (2013.01); *G02F 1/01* (2013.01); *H04B 10/5161* (2013.01); *H04B 10/548* (2013.01); *H04L 27/2096* (2013.01); *H04L 27/3488* (2013.01); *H04L 27/36* (2013.01)

(58) Field of Classification Search
CPC .............. H04B 10/548; H04B 10/541; H04B 10/5161
USPC .................................................. 398/185, 184
See application file for complete search history.

(56) References Cited

U.S. PATENT DOCUMENTS 5,815,531 A * 9/1998 Dent ..................... H04L 1/0054
332/103
5,946,119 A * 8/1999 Bergano ............... H04B 10/505
398/186

(Continued)

FOREIGN PATENT DOCUMENTS

CN 1604580 A 4/2005
CN 19272161 A 5/2007

(Continued)

OTHER PUBLICATIONS

EP Article 94(3) Communication, dated Aug. 19, 2014, in connection with European Patent Application No. 12 188 972.9-1505, all pages.

(Continued)

*Primary Examiner* — Oommen Jacob
(74) *Attorney, Agent, or Firm* — Leffler Intellectual Property Law, PLLC

(57) ABSTRACT

A $2^n$-QAM (e.g. 16-QAM) optical modulator comprising cascaded I-Q modulators. The first I-Q modulator applies $2^{n-2}$ (e.g. 4) QAM to an optical signal, having a constellation diagram with the $2^{n-2}$ (e.g., 4) constellation points located in quadrant I. The second I-Q modulator subsequently applies a quaternary phase-shift keying (QPSK) modulation scheme to the optical signal, thereby rotating the constellation points of the $2^{n-2}$-QAM modulation scheme to quadrants II, III and IV, to produce a $2^n$-QAM modulation constellation diagram. The rotation causes the $2^n$-QAM modulator to inherently apply four quadrant differential encoding to the optical signal. A method of $2^n$-QAM optical modulation is also provided and optical signal transmission apparatus comprising the $2^n$-QAM optical modulator.

14 Claims, 10 Drawing Sheets

(51) Int. Cl.
| | |
|---|---|
| H04B 10/12 | (2006.01) |
| H04B 10/54 | (2013.01) |
| H04B 10/516 | (2013.01) |
| H04B 10/548 | (2013.01) |
| H04L 27/20 | (2006.01) |
| H04L 27/34 | (2006.01) |
| H04L 27/36 | (2006.01) |
| G02F 1/01 | (2006.01) |

(56) References Cited

U.S. PATENT DOCUMENTS

| | | | |
|---|---|---|---|
| 6,310,709 B1* | 10/2001 | Bergano | H04B 10/532 398/154 |
| 6,744,992 B2* | 6/2004 | Bergano | H04B 10/532 398/152 |
| 7,426,243 B2 | 9/2008 | Chen et al. | |
| RE40,978 E* | 11/2009 | Oshima | 348/726 |
| RE41,001 E* | 11/2009 | Oshima | 348/E5.108 |
| 8,239,728 B1* | 8/2012 | Moon | G06F 11/1012 714/755 |
| 8,903,253 B2* | 12/2014 | Secondini | 398/182 |
| 2002/0159121 A1* | 10/2002 | Spickermann | H04B 10/50 398/200 |
| 2003/0147646 A1* | 8/2003 | Zitelli | H04B 10/505 398/65 |
| 2003/0198478 A1* | 10/2003 | Vrazel | H04B 10/505 398/183 |
| 2004/0028418 A1 | 2/2004 | Kaplan et al. | |
| 2004/0114450 A1* | 6/2004 | Kang | H04L 27/36 365/230.03 |
| 2005/0175357 A1* | 8/2005 | Kawanishi | H04B 1/7174 398/187 |
| 2005/0210354 A1* | 9/2005 | Kurokami | H03F 1/3241 714/747 |
| 2006/0022765 A1* | 2/2006 | Farag | H04L 5/12 332/103 |
| 2006/0140299 A1* | 6/2006 | Jin | H04L 27/3433 375/261 |
| 2006/0263097 A1* | 11/2006 | Akiyama | H04B 10/505 398/188 |
| 2007/0046952 A1 | 3/2007 | Kikuchi | |
| 2007/0054624 A1 | 3/2007 | Kashiwagi | |
| 2007/0147547 A1* | 6/2007 | Chen | H04L 27/3488 375/332 |
| 2007/0177882 A1* | 8/2007 | Akiyama | G02F 1/2255 398/185 |
| 2007/0274731 A1 | 11/2007 | Boffi et al. | |
| 2008/0056727 A1* | 3/2008 | Nishihara | H04B 10/505 398/155 |
| 2008/0074732 A1 | 3/2008 | Stephens | |
| 2008/0085127 A1* | 4/2008 | Nakamoto | H04B 10/25137 398/185 |
| 2008/0240726 A1* | 10/2008 | Wang | H04B 10/505 398/141 |
| 2009/0169148 A1* | 7/2009 | Doerr | G02F 1/2257 385/3 |
| 2009/0324253 A1* | 12/2009 | Winzer | H04B 10/505 398/185 |
| 2010/0054756 A1* | 3/2010 | Nishihara | H04B 10/5051 398/185 |
| 2010/0080571 A1* | 4/2010 | Akiyama | G02F 1/0123 398/184 |
| 2010/0111466 A1 | 5/2010 | Doerr et al. | |
| 2010/0202785 A1 | 8/2010 | Kawanishi et al. | |
| 2011/0051215 A1* | 3/2011 | Zhou | H04B 10/505 359/238 |
| 2012/0213522 A1* | 8/2012 | Zhang | H04J 14/02 398/82 |
| 2013/0089340 A1* | 4/2013 | Huang | H04B 10/541 398/186 |
| 2015/0104192 A1* | 4/2015 | Huang | H04B 10/541 398/186 |
| 2015/0125161 A1* | 5/2015 | Secondini | H04B 10/5161 398/186 |

FOREIGN PATENT DOCUMENTS

| | | |
|---|---|---|
| DE | 20 2006 000 197 U1 | 5/2006 |
| WO | 2011/028275 A1 | 3/2011 |

OTHER PUBLICATIONS

First Chinese Search Report, dated Mar. 21, 2013, in connection with counterpart Chinese Patent Application No. 200880131440.3, all pages.

Translation of First Chinese Search Report, dated Mar. 21, 2013, in connection with counterpart Chinese Patent Application No. 200880131440.3, all pages.

Kikichi, N. "Amplitude and Phase Modulated 8-ary and 16-ary Multilevel Signaling Technologies for High-speed Optical Fiber Communication" Proc. SPIE 6021, Optical Transmission, Switching, and Subsystems III, 60217 (Dec. 9, 2005), XP-002514203, pp. 1-8.

Sekine, K. et al. "40 Gbit/s, 16-ary (4bit/symbol) optical modulation/demodulation scheme" IEEE Electronics Letters, vol. 41, No. 7, Stevenage, GB, Mar. 21, 2005, pp. 1-2.

Serbay, M. et al. "42.8 Gbit/s, 4 Bits per Symbol 16-ary Inverse-RZ-QASK-DQP SK Transmission Experiment without Polmux" Optical Fiber Communication Conference and Exposition, National Fiber Optic Engineers Conference, Mar. 1, 2007, Optical Society of America, pp. 1-3.

Japanese Office Action, mailed Jul. 30, 2012, in connection with Japanese Patent Application No. 2011-520332.

Translation of Japanese Office Action, mailed Jul. 30, 2012, in connection with Japanese Patent Application No. 2011-520332.

Sekine et al. "Study on Optical 16-ary Amplitude-Phase-shift Keying" IEICE Technical Report on Optical Communication, IEICE, Apr. 15, 2005, vol. 105, No. 32, pp. 29-34.

Translation of Sekine et al. "Study on Optical 16-ary Amplitude-Phase-shift Keying" IEICE Technical Report on Optical Communication, IEICE, Apr. 15, 2005, vol. 105, No. 32, pp. 29-34.

A Communication from a foreign patent office, dated Aug. 15, 2011, in counterpart European Patent Application No. EP08803849, all pages.

Sakamoto, T. et al. "50-Gb/s QAM by a quad-parallel Mach-Zehnder Modulator" 2007 33rd European Conference and Exhibition of Optical Communication—Post-deadline Papers (published 2008), Sep. 16-20, 2007, Berlin, Germany, pp. 1-2. ISBN: 978-3-8007-3059-9, XP009117340.

PCT International Search Report, dated Feb. 18, 2009, in connection with International Application No. PCT/EP2008/061881, all pages.

Kikcuhi, N. "Amplitude and Phase Modulated 8-ary and 16-ary Multilevel Signaling Technologies for High-speed Optical Fiber Communication" APOC 2005: Asia-Pacific Optical Communications, vol. 6021, Nov. 6, 2005, pp. 1-8, XP002514203, Shanghai, China.

Sekine, K. et al. 40Gbit/s, 16-ary (4 bit/symbol0 optical modulation/demodulation scheme Electronics letters, IEEE, Stevenage, GB, vol. 41, No. 7, Mar. 31, 2005, pp. 430-432, XP006023796, ISSN: 0013-5194.

Murat, Serbay et al. "42.8 Gbit/s, 4 Bits per Symbol 16-ary Inverse-RZ-QASK-DQPSK Transmission Experiment without Polmux" Optical Fiber Communication Conference and Exposition National Fiber Optic Engineers Conference, OFCNFOEC 2007—Mar. 25-29, 2007—Anaheim, CA, USA, IEEE, Piscataway, NJ, USA, Mar. 1, 2007, pp. 1-3, XP031146660, ISBN: 978-1-55752-831-5.

Werner, R. et al. "Orthogonal Frequency Division Multiplexing (OFDM) and other Advanced Options to achieve 100Gb/s Eternet Transmission" Transparent Optical Networks, 2007, ICTON '07. 9th International Conference on, IEEE, PI, Jul. 1, 2007, pp. 12-15, XP031130438, ISBN: 978-1-4244-1248-8.

Kikuchi, N. et al. "Incoherent 32-Level Optical Multilevel Signaling Technologies" Journal of Lightwave Technology, IEEE Service Center,New York, NY, US, vol. 26, No. 1, Jan. 1, 2008, pp. 15-157, XP011204214, ISSN: 0733-8724.

(56) References Cited

OTHER PUBLICATIONS

Ho, K.P. et al. "Generation of arbitrary quadrature signals using one dual-drive modulator," Journal of Lightwave Technology, vol. 23, No. 2, pp. 764-660, Feb. 2005.

Seimetz, M. "Multiformat transmitters for coherent optical M-PSK and M-QAM transmission" in Proceedings ICTON'05, 2005, pp. 225-229, paper Th.B1.5.

Ip, Ezra et al. "Carrier synchronization for 3- and 4-bit-per-symbol optical transmission," Journal of Lightwave Technology, vol. 23, No. 12, pp. 4110-4114, Dec. 2005.

Weber, W. J. "Differential encoding for multiple amplitude and phase shift keying systems", IEEE Trans. Commun., vol. 26, No. 3, Mar. 1978, pp. 385-391.

Proakis, J. G. "Digital Communications", 4th ed. New York: McGraw-Hill, 2001, pp. 276-280.

* cited by examiner

OPTICAL SIGNAL MODULATION

CROSS-REFERENCE TO RELATED APPLICATIONS

This application claims the benefit of U.S. application Ser. No. 13/055,126, filed Jan. 20, 2011, which is a National Stage of PCT Application No. PCT/EP2008/061881, filed Sep. 8, 2008, which applications are hereby incorporated herein by reference in their entireties. This application claims priority under 35 U.S.C. §119 to European Patent Application No. 08161561.9, filed Jul. 31, 2008, which is hereby incorporated herein by reference in its entirety.

TECHNICAL FIELD

The invention relates to a $2^n$-quadrature amplitude modulation (QAM) optical modulator, a method of $2^n$-quadrature amplitude modulation, and optical signal transmission apparatus comprising the $2^n$-QAM optical modulator.

BACKGROUND

Quadrature amplitude modulation with 16 levels (16-QAM) is one of the candidate modulation formats for 100 Gigabit/s (Gbit/s) transmission into optical fibre. It encodes four bits on a constellation of sixteen points, with four different amplitude values of both the in-phase and quadrature components of the transmitted signal. When considering a polarization-diversity 16-QAM format for the transmission of 100 Gbit/s, the required symbol-rate for the transmitter is 12.5 Gbaud. Even at this reduced symbol-rate, the generation of multi-level driving signals can be complicated. Further complication arises from the necessity of applying differential digital encoding to the optical signal before optical modulation, to solve the $\pi/2$ phase ambiguity of the QAM constellation which would otherwise arise when estimating the carrier phase at the receiver.

There are four known 16-QAM transmitter/modulator schemes, as follows. The first comprises a conventional in-phase/quadrature (I-Q) modulator in which each of the in-phase and quadrature components is a four-level signal that can be obtained by using a four-level driving voltage. Despite the simplicity of the optical scheme, the requirement of the generation of four-level driving voltages makes the transmitter less attractive for the implementation of 100 Gbit/s systems.

A second scheme comprises a single dual-drive Mach Zehnder modulator (MZM), as reported in K.-P. Ho and H.-W. Cuei, "Generation of arbitrary quadrature signals using one dual-drive modulator," J. Lightwave Technol., vol. 23, no. 2, pp. 764-770, February 2005. The output signal can assume any value in the complex plane by properly choosing the driving voltages for the two MZMs. This scheme features the simplest optical components, however, the generation of the 16-QAM constellation requires a very complex driving-voltage scheme with up to 16-level signals.

A third 16-QAM transmitter structure, comprising a phase and amplitude I-Q modulator, requiring only two-level driving voltages, has been reported in M. Seimetz, "Multiformat transmitters for coherent optical M-PSK and M-QAM transmission", in Proc. ICTON'05, 2005, pp. 225-229, paper Th.B1.5. The basic structure is similar to a conventional I-Q modulator but each branch also comprises a phase modulator. In each arm, the MZM generates the two amplitude levels $\{1/3, 1\}$, and the phase modulator (PM) sets the phase to zero or $\pi$, to obtain the required four-level signals in each quadrant of the constellation diagram.

The fourth 16-QAM transmitter structure comprises two quaternary phase shift keying (QPSK) modulators nested inside a Mach-Zehnder interferometer having an 80:20 output combining ratio, as reported in J. M. Kahn and E. Ip, "Carrier synchronization for 3- and 4-bit-per-symbol optical transmission", J. Lightwave Technol., vol. 23, no. 12, pp. 4110-4114, December 2005. This scheme achieves a 16-QAM modulation by using binary driving signals for each QPSK modulator. However, it still requires electrical processing of the input bit sequence to apply quadrant differential encoding.

Lower and higher order QAM, such as quaternary amplitude modulation (4-QAM) and 64-QAM, are also known for digital data encoding, and will be referred to herein collectively as $2^n$-QAM.

SUMMARY

It is the object to obviate at least some of the above disadvantages and provide an improved $2^n$-QAM optical modulator and optical signal transmission apparatus.

According to a first aspect of the invention there is provided a $2^n$-quadrature amplitude modulation optical modulator comprising:
an optical input;
a first optical modulation apparatus configured to apply a $2^{n-2}$ amplitude modulation scheme having $2^{n-2}$ constellation points arranged in a constellation in a first quadrant of its constellation diagram to a received optical signal; and
a second optical modulation apparatus configured to selectively rotate the phase of a received optical signal,
wherein the optical input is configured to deliver an optical signal to be modulated to one of the first and second optical modulation apparatus, the said apparatus generating an intermediate optical signal and further being configured to deliver the intermediate optical signal to the other of the first and second optical modulation apparatus,
thereby generate a modulated output optical signal having a square constellation diagram comprising $2^n$ constellation points distributed across the four quadrants of the constellation diagram.

The $2^n$-QAM constellation diagram quadrant is thereby set by rotating the constellation points in the first quadrant, rather than translating them as in the nested QPSK 16-QAM transmitter scheme. This rotation is equivalent to applying a four quadrant differential encoding. The $2^n$-QAM optical modulator thereby automatically performs quadrant differential encoding, with no additional optical components being required to apply the encoding.

Preferably, n is an even number and is at least 4, most preferably 4 or 6, the constellation points of the first optical modulation apparatus being arranged in a substantially square constellation. A 16-QAM or 64-QAM optical modulator is therefore provided which has inherent differential quadrant encoding.

The first quadrant is preferably quadrant I.

The first optical modulation apparatus preferably comprises:
an in-phase/quadrature optical modulator comprising an optical input configured to receive an optical signal to be modulated, an in-phase branch comprising a first optical modulator, a quadrature branch comprising a second optical modulator and a $\pi/2$ phase shifter, and an optical output; and drive apparatus configured to deliver $\sqrt{(2^{n-2})}$-level electrical drive signals to the first and second optical modulators, such that the in-phase/quadrature optical modulator is operable to apply the $2^{n-2}$ amplitude modulation scheme.

A 16-QAM optical modulator therefore requires only two-level (binary) electrical driving signals, and performs quadrant differential encoding without requiring additional optical components. In addition, the use of binary electrical driving signals substantially avoids the heavy distortion which multi-level drive signals can experience, due to modulator bandwidth limitations and non-linearity, in high speed transmission applications. A 64-QAM optical modulator would require only four-level electrical driving signals, and therefore requires simpler drive signals than required for known 64-QAM optical modulators.

The first and second optical modulators preferably comprise Mach-Zehnder modulators. Any noise in the electrical drive signals will therefore be substantially absorbed by the $\sin^2$ transfer function of the Mach-Zehnder modulators. The $2^n$-QAM optical modulator also produces generally straight transitions between the output signal symbols which offers the benefit of creating stable decision points for all symbol combinations.

Preferably, n is 4 and the two-level electrical drive signals comprise approximately 0.39 $V_\pi$, where $V_\pi$ is the switching voltage of the respective Mach-Zehnder modulator, and zero volts. The Mach-Zehnder modulators thereby generate output signal amplitude levels of ⅓ and 1, giving the in-phase/quadrature optical modulator an output signal symbol constellation having points in quadrant I at $I_1$ (in-phase axis), $Q_1$ (quadrature axis) locations: ⅓, ⅓; 1, ⅓; ⅓, 1; and 1, 1.

Preferably, the secondary optical modulation apparatus is configured to apply a quaternary phase-shift keying modulation scheme having four modulation levels of substantially equal amplitude and 90 degree separated phases, giving the modulation scheme a square constellation diagram having a constellation point in each quadrant, to the received optical signal to thereby selectively rotate the phase of the received optical signal.

Preferably, the second optical modulation apparatus comprises:
a second in-phase/quadrature optical modulator comprising an optical input, an in-phase branch comprising a third optical modulator, a quadrature branch comprising a fourth optical modulator and a π/2 phase shifter, and an optical output; and
second drive apparatus configured to deliver two-level electrical drive signals to the third and fourth optical modulators, the electrical drive signals being of different voltages than the electrical drive signals to the first and second optical modulators, such that the second optical modulation apparatus applies a quaternary phase-shift keying modulation scheme having four modulation levels of substantially equal amplitude and 90 degree separated phases, giving the modulation scheme a square constellation diagram having a constellation point in each quadrant, to the received modulated optical signal.

Output signal symbols at constellation points in quadrant I are thereby respectively left in quadrant I or rotated to quadrant II, III or IV of the constellation diagram.

The third and fourth optical modulators preferably comprise Mach-Zehnder modulators.

The two-level electrical drive signals to the third and fourth optical modulators preferably comprise $V_\pi$, where $V_\pi$ is the switching voltage of the respective Mach-Zehnder modulator, and zero volts. The third and fourth Mach-Zehnder modulators thereby generate output signal amplitude levels of −1 and 1, giving the second in-phase/quadrature optical modulator a constellation diagram comprising four constellation points at $I_2$ (in-phase axis), $Q_2$ (quadrature axis) locations: 1, 1; 1, −1; −1, −1, −1, 1.

This rotation is equivalent to applying a four quadrant differential encoding. The second in-phase/quadrature optical modulator thereby inherently applies quadrant differential encoding to the modulated optical signal.

Preferably, the optical output of the in-phase/quadrature optical modulator is coupled to the optical input of the second in-phase/quadrature optical modulator, thereby cascading the optical modulators.

The first and second drive apparatus preferably each comprise first and second drivers respectively driving each Mach-Zehnder modulator. Alternatively, the first and second drive apparatus may be provided as a single device.

The second optical modulation apparatus may alternatively comprise a phase modulator configured to selectively rotate the phase of the received signal by zero degrees, 90 degrees, 180 degrees, or 270 degrees. This rotation is equivalent to applying a four quadrant differential encoding. The phase modulator thereby inherently applies quadrant differential encoding to the modulated optical signal.

The $2^n$-quadrature amplitude modulation optical modulator may further comprise a differential encoder operable to apply differential encoding to the first two bits of the n bits of a data symbol generated by the $2^n$-quadrature amplitude modulation optical modulator.

According to a second aspect of the invention there is provided optical signal transmission apparatus comprising:
an optical source having an optical output and being operable to generate an optical data signal; and
a $2^n$-quadrature amplitude modulation optical modulator according to the first aspect of the invention,
the optical output of the optical source being coupled to the first optical modulation apparatus.

The optical signal transmission apparatus thereby inherently applies quadrant differential encoding to a transmitted optical signal, with no additional operations being required to achieve the encoding.

According to a third aspect of the invention there is provided a method of $2^n$-quadrature amplitude modulation comprising the steps:
a) receiving an optical signal to be modulated;
b) generating an intermediate optical signal by applying to the received optical sign one of:
   a. a $2^{n-2}$ amplitude modulation scheme having $2^n$ constellation points arranged in a constellation in a first quadrant of its constellation diagram to the optical signal; and
   b. a selective phase rotation to the optical signal to selectively rotate the phase of the optical signal; and
c) applying to the intermediate optical signal the other of a. and b., to thereby generate an output optical signal having a constellation diagram comprising $2^n$ constellation points distributed across the four quadrants of the constellation diagram.

The method inherently applies quadrant differential encoding during modulation of an optical signal, with no additional processing steps being required in order to achieve the required encoding.

Preferably, n is an even number and is at least 4, most preferably 4 or 6, the constellation points being arranged in a substantially square constellation.

Preferably, applying a. comprises:
I. delivering the optical signal to an in-phase/quadrature optical modulator comprising an optical input configured to receive an optical signal to be modulated, an in-phase branch comprising a first optical modulator, a quadrature branch comprising a second optical modulator and a π/2 phase shifter, and an optical output; and II. delivering $\sqrt{(2^{n-2})}$-level electrical drive signals to the first and second optical modulators, such that the in-phase/quadrature optical modulator applies a $2^{n-2}$ amplitude modulation scheme having $2^{n-2}$ constellation points arranged in a square constellation in the first quadrant of its constellation diagram to the received optical signal.

16-QAM optical modulation therefore requires only the use of two-level (binary) electrical driving signals, thereby performing quadrant differential encoding without requiring additional processing steps. In addition, driving the first and second optical modulations with binary electrical driving signals substantially avoids the heavy distortion which multi-level drive signals can experience, due to modulator bandwidth limitations and non-linearity, in high speed transmission applications. 64-QAM optical modulation using the present method requires only four-level electrical driving signals, and similarly inherently performs quadrant differential encoding.

Preferably, the first and second optical modulators comprise Mach-Zehnder modulators, n is 4 and step II. comprises delivering two-level electrical drive signals of approximately 0.39 $V_\pi$, where $V_\pi$ is the switching voltage of the respective Mach-Zehnder modulator, and zero volts to each of the Mach-Zehnder modulators.

Any noise in the electrical drive signals will therefore be substantially absorbed by the $\sin^2$ transfer function of the Mach-Zehnder modulators. The method of $2^n$-QAM also produces generally straight transitions between the output signal symbols which offers the benefit of creating stable decision points for all symbol combinations.

Preferably, b. comprises applying a quaternary phase-shift keying modulation scheme having four modulation levels of substantially equal amplitude and 90 degree separated phases, giving the modulation scheme a square constellation diagram having a constellation point in each quadrant.

Applying the QPSK modulation scheme selectively leaves the output signal symbols at constellation points in quadrant I or rotates them by a desired amount to quadrant II, III or IV of the constellation diagram.

Preferably, applying b. comprises:
i. delivering the optical signal to a second in-phase/quadrature optical modulator comprising an optical input configured to receive an optical signal to be modulated, an in-phase branch comprising a third optical modulator, a quadrature branch comprising a fourth optical modulator and a π/2 phase shifter, and an optical output; and
ii. delivering two-level electrical drive signals to the third and fourth optical modulators, such that the in-phase/quadrature optical modulator applies a quaternary phase-shift keying modulation scheme having four modulation levels of substantially equal amplitude and 90 degree separated phases, giving the modulation scheme a square constellation diagram having a constellation point in each quadrant.

Selectively rotating the phase of the optical signal is equivalent to applying a four quadrant differential encoding. Applying the QPSK modulation scheme thereby inherently applies quadrant differential encoding during the modulation of the optical signal.

Preferably, the third and fourth optical modulators comprise Mach-Zehnder modulators and step ii. comprises delivering two-level electrical drive signals of approximately $V_\pi$, where $V_\pi$ is the switching voltage of the respective Mach-Zehnder modulator, and zero volts to each of the Mach-Zehnder modulators.

Applying b. may alternatively comprise delivering the optical signal to a phase modulator and selectively applying a phase rotation of zero degrees, 90 degrees, 180 degrees, or 270 degrees to the optical signal.

Applying the phase rotation is equivalent to applying a four quadrant differential encoding. The method of $2^n$-QAM modulation thereby inherently applies quadrant differential encoding during modulation of the optical signal.

The method of $2^n$-quadrature amplitude modulation may further comprise applying differential encoding to the first two bits of the n bits of a data symbol generated using the said method.

An embodiment of the invention will now be described in detail, by way of example only, with reference to the accompanying drawings.

DETAILED DESCRIPTION

Referring to FIGS. 1 to 4, a first embodiment of the invention provides a $2^n$-quadrature amplitude modulation (QAM) optical modulator in the form of a 16-QAM optical modulator 10 comprising an optical input 11, a first optical modulation apparatus 12, and a second optical modulation apparatus 20. In this embodiment, an optical signal to be modulated is received by the optical input 11 and coupled to the first optical modulation apparatus 12, which applies a quaternary aptitude modulation scheme to the optical signal, generating an intermediate optical signal.

Figure 4:
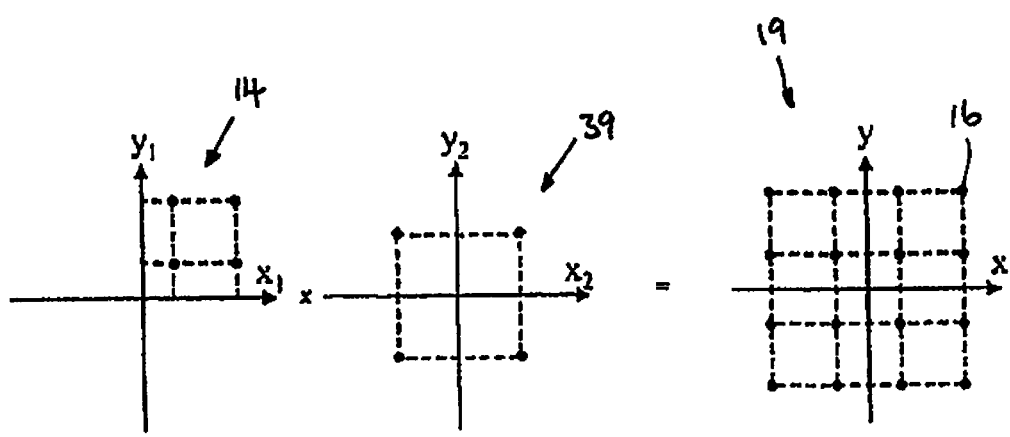
FIG. 4 illustrates that the product of the constellation diagrams of FIGS. 2 and 3 produce a constellation diagram for a square 16-QAM optical modulation scheme.

The intermediate optical signal is then delivered to the second optical modulation apparatus 20, which is configured to selectively rotate the phase of the intermediate optical signal. A 16-QAM modulated optical signal is thereby output from the optical modulator 10 which has a square constellation diagram 19, as shown in FIG. 4, comprising 16 constellation points 16 distributed across the 4 quadrants of the constellation diagram.

The first optical modulation apparatus 12 comprises an in-phase/quadrature (I-Q) optical modulator 22, comprising an optical input 24 configured to receive an optical signal to be modulated, an in-phase branch 26, and a quadrature branch 30. The in-phase branch 26 comprises a first optical modulator in the form of a Mach-Zehnder modulator (MZM) 28 driven by a first driver unit (not shown). The quadrature branch comprises a second optical modulator in the form of a second Mach-Zehnder modulator 32 driven by a second driver unit (not shown), and a $_\pi$phase shifter 34. The in-phase branch 26 and quadrature branch 30 are coupled at their output ends to form the optical output 36 of the I-Q modulator 22.

Figure 2:
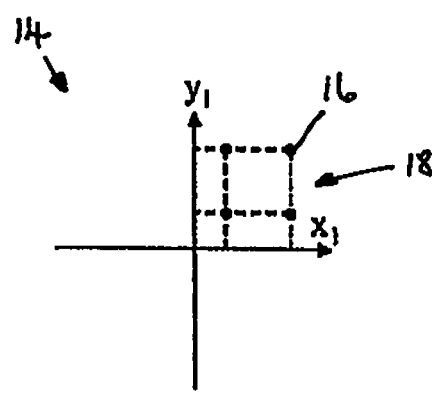
FIG. 2 is the constellation diagram of the first in-phase/quadrature optical modulator (first modulation apparatus) of the 16-QAM optical modulator of FIG. 1.

The first Mach-Zehnder modulator 28 is driven with binary drive voltages ($V_{x1}$) of approximately 0.39 $V_\pi$, where $V_\pi$ is the switching voltage of the Mach-Zehnder modulator 28, and zero volts. The second Mach-Zehnder modulator 32 is similarly driven with the same binary voltage levels ($V_{y1}$). The Mach-Zehnder modulators 28, 32 thereby generate output signal amplitude levels of ⅓ and 1, giving the I-Q optical modulator 22 an output signal symbol constellation 14 having four constellation points 16 in quadrant I at in-phase axis ($x_1$) and quadrature axis ($y_1$) locations: ⅓, ⅓; 1, ⅓; ⅓, 1; and 1, 1, as shown in FIG. 2.

In this embodiment, the second optical modulation apparatus 20, comprises a second I-Q optical modulator 38, comprising an optical input 40, an in-phase branch 42 and a quadrature branch 46. The in-phase branch comprises a third Mach-Zehnder modulator 44. The quadrature branch 46 comprises a fourth Mach-Zehnder modulator 48 and a second π/2 phase shifter 50. The optical output ends of the in-phase and quadrature branches 42, 46 are coupled together to form the output 52 of the second I-Q modulator 38, which form the output of the 16-QAM optical modulator 10.

Figure 3:
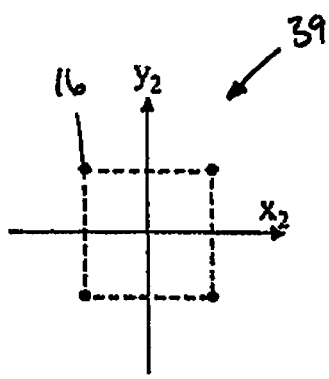
FIG. 3 is the constellation diagram of the second in-phase/quadrature optical modulator (second modulation apparatus) of the 16-QAM optical modulator of FIG. 1.

The third Mach-Zehnder modulator 44 is driven with binary electrical drive voltages ($V_{x2}$) of $V_\pi$ and zero volts, and the fourth Mach-Zehnder modulator 48 is similarly driven with binary electrical drive signals ($V_{y2}$) of $V_\pi$ and zero volts. The third and fourth Mach-Zehnder modulators are therefore driven with different voltages to the first and second Mach-Zehnder modulators 28, 32. The applied binary electrical drive signals give the second I-Q modulator 38 a quaternary phase-shift keying (QPSK) modulation scheme having 4 modulation levels of substantially equal amplitude and 90° separation in-phase. The second I-Q modulator 38 therefore applies a modulation scheme having a square constellation diagram 39 comprising a constellation 16 point located in each quadrant, as shown in FIG. 3.

Figure 5:
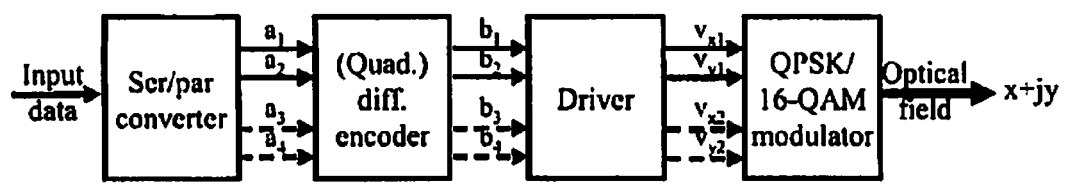
FIG. 5 illustrates the general scheme for a prior art QPSK or 16-QAM transmitter.

The general scheme of a known differential optical transmitter is shown in FIG. 5. Due to the 4-fold rotation symmetry, QAM formats suffer from a 4-fold phase ambiguity (multiples of π/2) in the estimation of the carrier phase. The optimal coding to resolve the phase ambiguity problem in QAM with a minimum coding penalty is quadrant differential encoding. Given a $2^n$-QAM format, with n even, each symbol is represented by $2^n$ bits. The first 2 bits are differentially encoded, as in the Differential QPSK format, and represent the change in quadrant, while the remaining bits are Gray coded in each quadrant.

In the known Phase and Amplitude I-Q and nested QPSK modulators, two driving voltages determine the quadrant, while the other two determine the point inside the quadrant. Therefore, the encoder can be realized by differentially encoding the first two bits through the same logic operations given for a DQPSK:

$$b_{1,k}=\overline{(a_{1,k}\oplus a_{2,k})}\cdot(a_{1,k}\oplus b_{1,k-1})+(a_{1,k}\oplus a_{2,k})\cdot(a_{2,k}\oplus b_{2,k-1})$$

$$b_{2,k}=\overline{(a_{1,k}\oplus a_{2,k})}\cdot(a_{2,k}\oplus b_{2,k-1})+(a_{1,k}\oplus a_{2,k})\cdot(a_{1,k}\oplus b_{1,k-1})$$

The four points in each quadrant of these modulators are respectively obtained by a reflection or translation of the points in the quadrant I. Quadrant differential encoding requires that the last two bits are Gray coded in each quadrant, with a pattern that is rotated according to the quadrant itself. As regards the Phase and Amplitude I-Q modulator, the reflection can be converted into a rotation by noting that the double reflection from quadrant I to quadrant III is equivalent to a rotation, while the reflection to quadrant II or IV can be converted into a rotation by simply swapping the two bits. The corresponding logic operations are:

$$b_{3,k}=\overline{(b_{1,k}\oplus b_{2,k})}\cdot a_{3,k}+(b_{1,k}\oplus b_{2,k})\cdot a_{4,k}$$

$$b_{4,k}=\overline{(b_{1,k}\oplus b_{2,k})}\cdot a_{4,k}+(b_{1,k}\oplus b_{2,k})\cdot a_{3,k}$$

As regards the nested QPSK modulator, the translation can be converted into a rotation by rotating the two bits according to the chosen quadrant. A similar operation is performed for a DQPSK, where the preceding coded bits, $b_{1,k-1}$ and $b_{2,k-1}$, are rotated according to the actual information bits, $a_{1,k}$ and $a_{2,k}$. Therefore, the required logic operations for this modulator can be obtained by:

$$b_{3,k}=\overline{(b_{1,k}\oplus b_{2,k})}\cdot(b_{1,k}\oplus a_{3,k})+(b_{1,k}\oplus b_{2,k})\cdot(b_{2,k}\oplus a_{4,k})$$

$$b_{4,k}=\overline{(b_{1,k}\oplus b_{2,k})}\cdot(b_{2,k}\oplus a_{4,k})+(b_{1,k}\oplus b_{2,k})\cdot(b_{1,k}\oplus a_{3,k})$$

In 16-QAM optical modulator 10 of this embodiment, differential encoding is applied to the first two bits ($b_1$, $b_2$) through the drive voltages ($V_{x1}$, $V_{y1}$) applied to the first and second Mach-Zehnder modulators 28, 32, according to the logic operations described above. However, the effective rotation of the constellation is diagram points 16 from quadrant I 18 of the constellation diagram 14 of the first I-Q modulator 22 by the QPSK modulation scheme of the second I-Q modulator 38 is equivalent to a four quadrant differential encoding. The 16-QAM optical modulator 10 thereby applies four quadrant differential encoding without requiring any additional operation to be performed on the optical signal, i.e.:

$$b_{3,5}=a_{3,k}$$

$$b_{4,5}=a_{4,k}$$

Figure 6A:
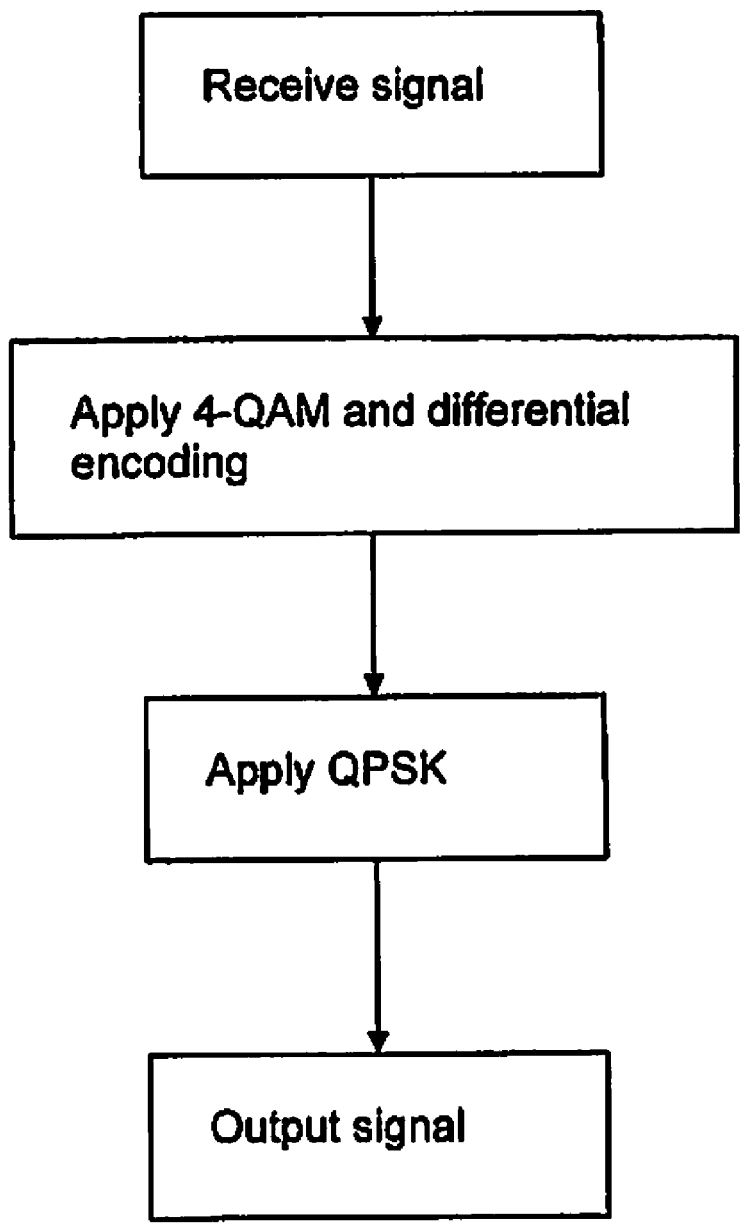
FIG. 6a is a flowchart illustrating the steps of a method of 16-QAM according to a second embodiment of the invention, implemented using the 16-QAM optical modulator of FIG. 1.

In use, a method of 16-QAM modulation according to a second embodiment of the invention is implemented using the 16-QAM optical modulator 10, as illustrated in the flow diagram of FIG. 6a. An optical signal to be modulated is received by the optical input 11 of the 16-QAM optical modulator 10, and is coupled to the optical input 24 of the first I-Q modulator 22, which applies a quaternary amplitude modulation scheme (4-QAM) having the constellation diagram 14 shown in FIG. 2. Differential encoding is applied to the first two bits via the drive voltages ($V_{x1}$, $V_{y1}$) applied to the first and second Mach-Zehnder modulators 28, 32. The resulting intermediate optical signal output from the first I-Q modulator 22 is coupled to the input 40 of the second I-Q modulator 38, which applies a QPSK modulation having the constellation diagram 39 as shown in FIG. 3. The phase of the intermediate optical signal is thereby selectively rotated, causing the constellation points of the intermediate optical signal, as shown in FIG. 2, to be selectively rotated into each of the remaining 4 quadrants, to therefore produce a 16-QAM modulated output optical signal having a constellation diagram 19 as shown in FIG. 4.

The cascading of the two I-Q modulators 22, 38 thereby results in an optical modulation scheme having a constellation diagram 19 which is equivalent to the product of the constellation diagram 14 of the first I-Q modulator 22 and the constellation diagram 39 of the second I-Q modulator 38. The first I-Q modulator 22 generates the small-square points 14 that are located in quadrant I 18, while the second I-Q modulator 38 generates the big-square points 39, that, apart from an irrelevant overall π/4 phase rotation, correspond to the phase rotations required to obtain the remaining 16-QAM constellations points in quadrants II, III, or IV. Including the π/4 phase rotation, the low-pass equivalent of the output signal is:

$$z = x + jy = (x_1 + jy_1)(x_2 + jy_2)e^{j\pi/4}$$

where the time dependence of the signal is omitted for simplicity of notation.

Figure 1:
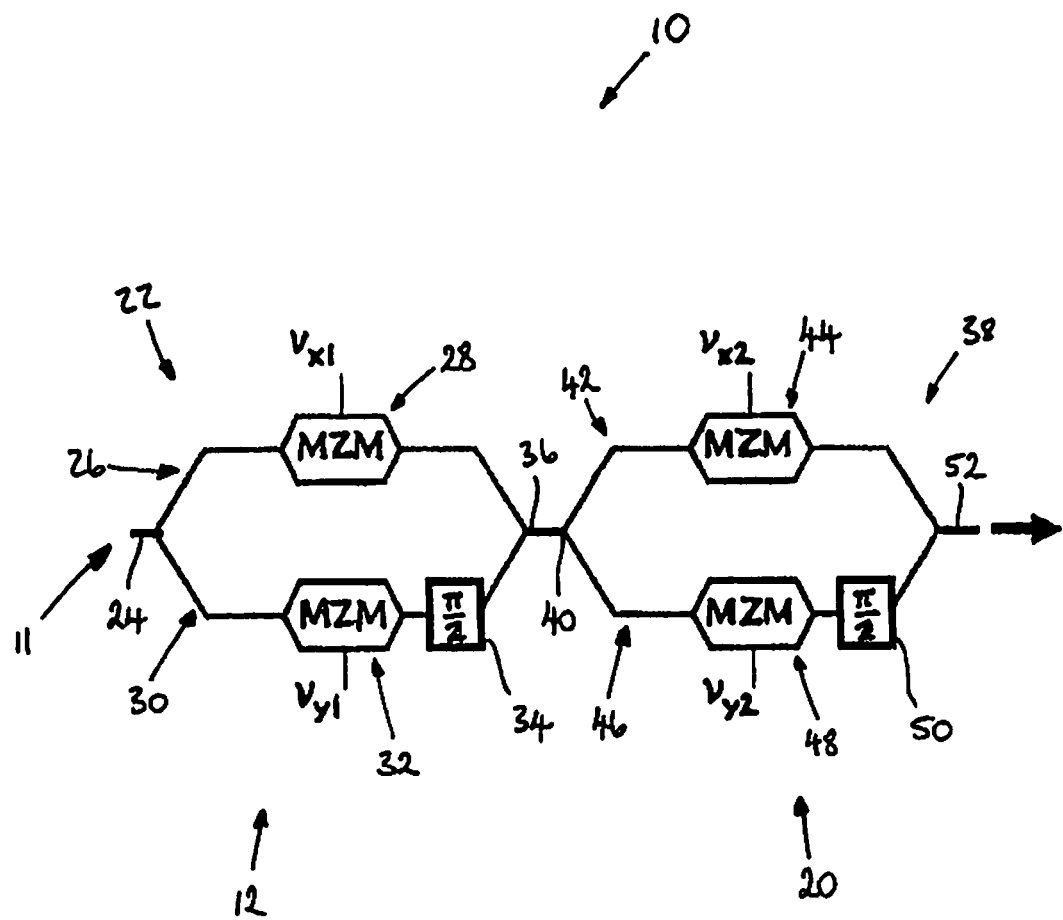
FIG. 1 is a schematic representation of a 16-QAM optical modulator according to a first embodiment of the invention.
Figure 7:
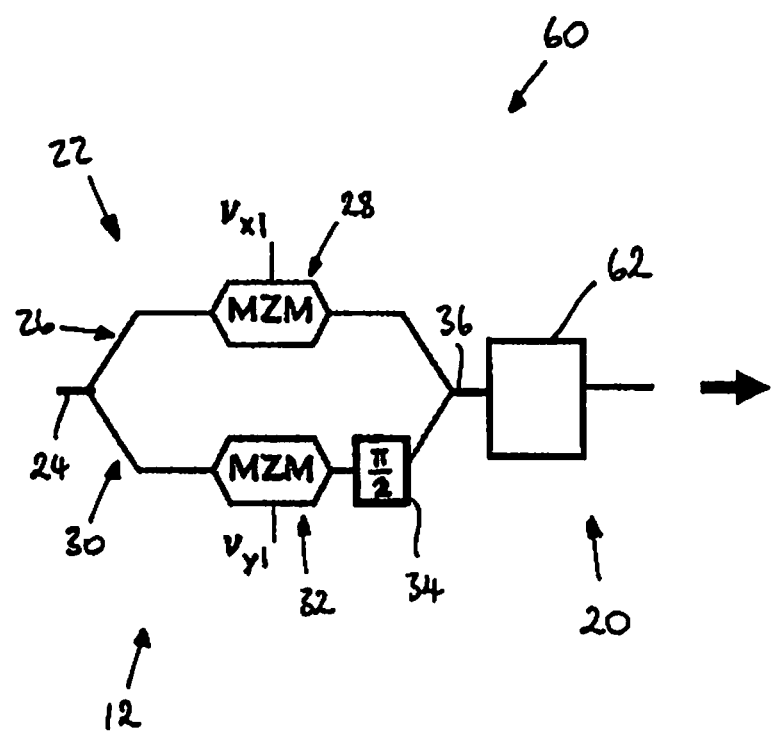
FIG. 7 is a schematic representation of a 16-QAM optical modulator according to a third embodiment of the invention.

Referring to FIG. 7, a third embodiment of the invention provides a 16-QAM optical modulator 60, which is substantially the same as the 16-QAM optical modulator 10 of FIG. 1, with the following modifications. The same reference numbers are retained for corresponding features.

In this embodiment, the second optical modulation apparatus 20 comprises a phase modulator 62 operable to selectively apply a phase rotation of 0°, 90°, 180° or 270° to the intermediate optical signal output from the first I-Q optical modulator 22. The phase rotation provided by the phase modulator 62 similarly inherently applies four quadrant differential encoding to the modulated optical signal.

Figure 8:
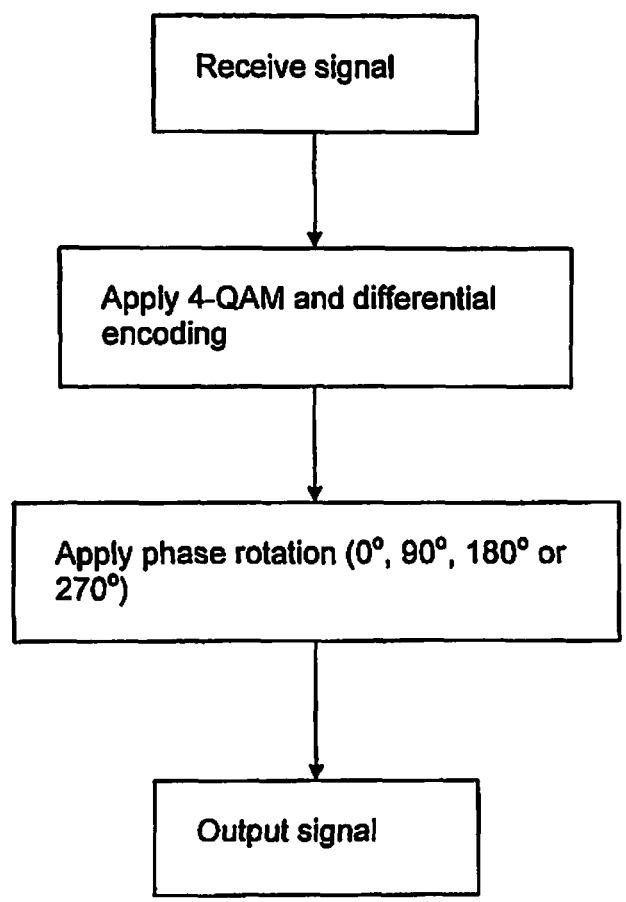
FIG. 8 is a flowchart illustrating the steps of a method of 16-QAM according to a fourth embodiment of the invention, implemented using the 16-QAM optical modulator of FIG. 7.

A fourth embodiment of the invention provides a method of 16-QAM implemented using the 16-QAM optical modulator of FIG. 7, and illustrated in the flow chart of FIG. 8. The method of this embodiment is substantially the same as the method shown in FIG. 6a, with the modification that the phase rotation is applied by the phase modulator 62 rather than by QPSK implemented by the second I-Q optical modulator 38.

Figure 9A:
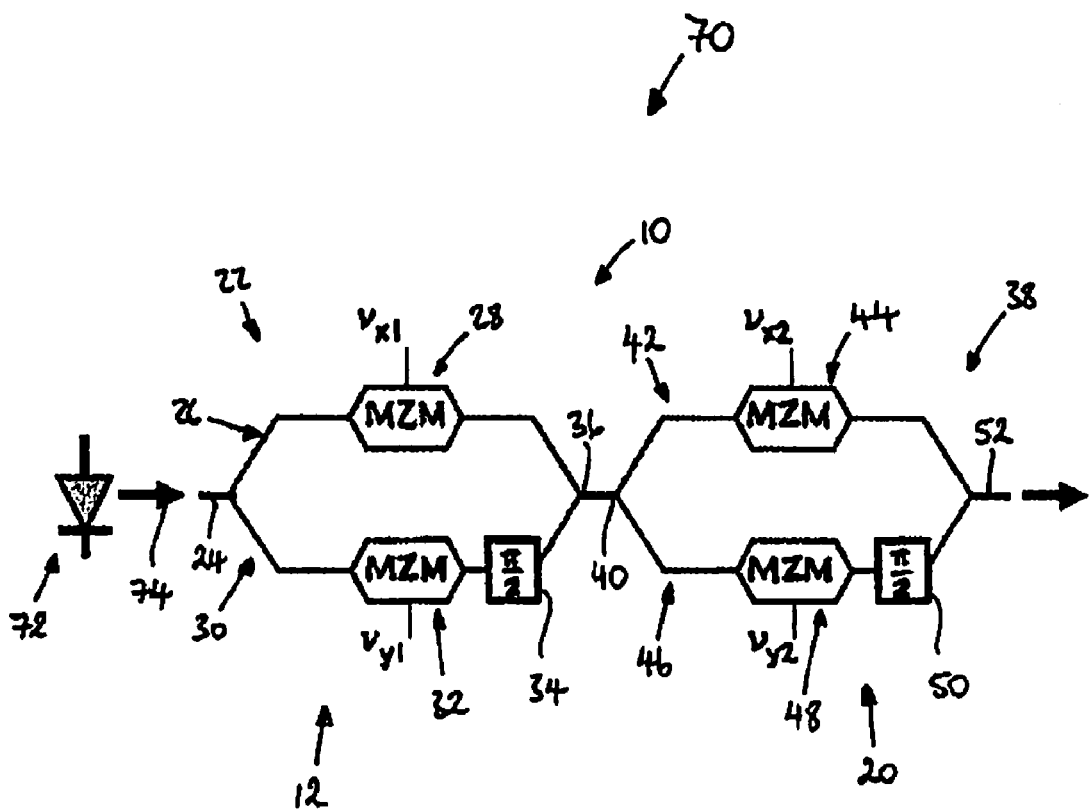
FIG. 9a is a schematic representation of an optical signal transmission apparatus according to a fifth embodiment of the invention.

Referring to FIG. 9a, a fifth embodiment of the invention provides an optical signal transmission apparatus 70 comprising the 16-QAM optical modulator 10 of the first embodiment and a data signal source in the form of a laser diode 72 operable to generate an optical signal data stream 74, which is coupled to the optical input 24 of the first I-Q optical modulator 22. The 16-QAM optical modulator 10 operates as described above to implement the method shown in the flow chart of FIG. 6a to the optical data signal.

Figure 6B:
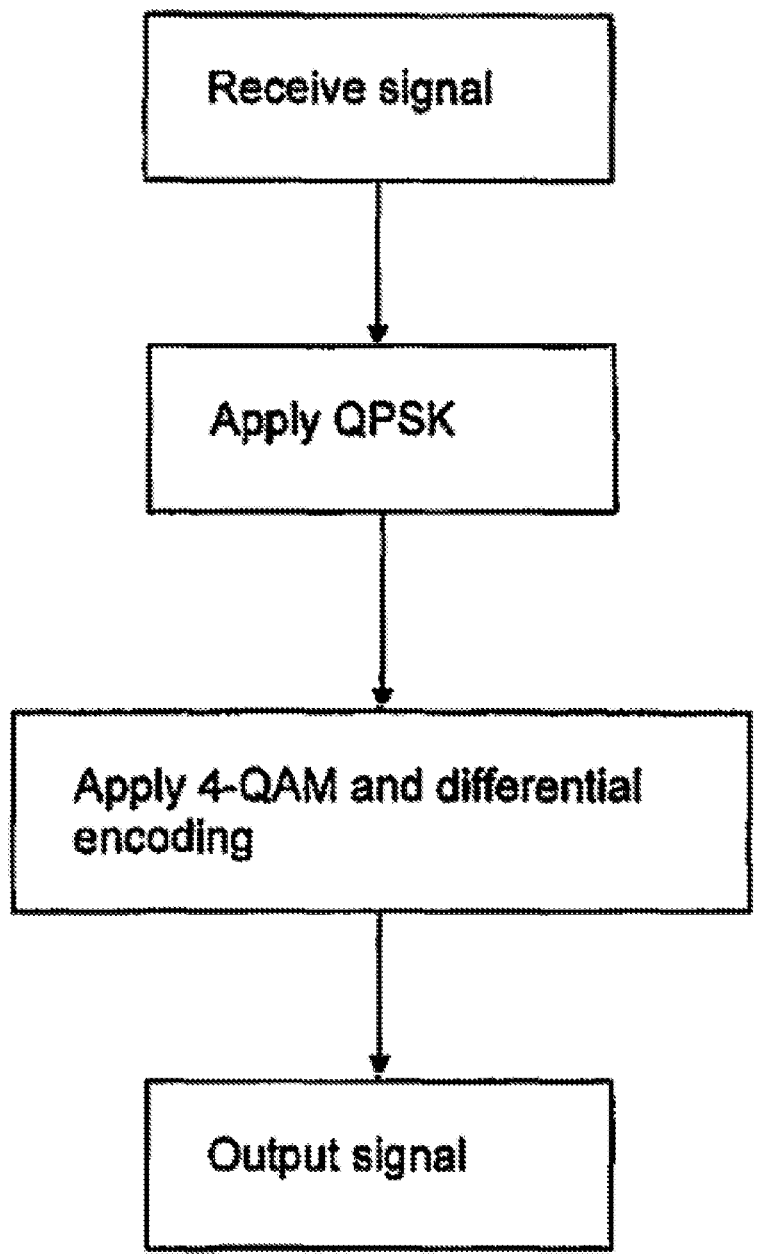
FIG. 6b is a flowchart illustrating the steps of a method of 16-QAM according to a modified form of a second embodiment of the invention in which modulation of signals is performed in reverse order.
Figure 9B:
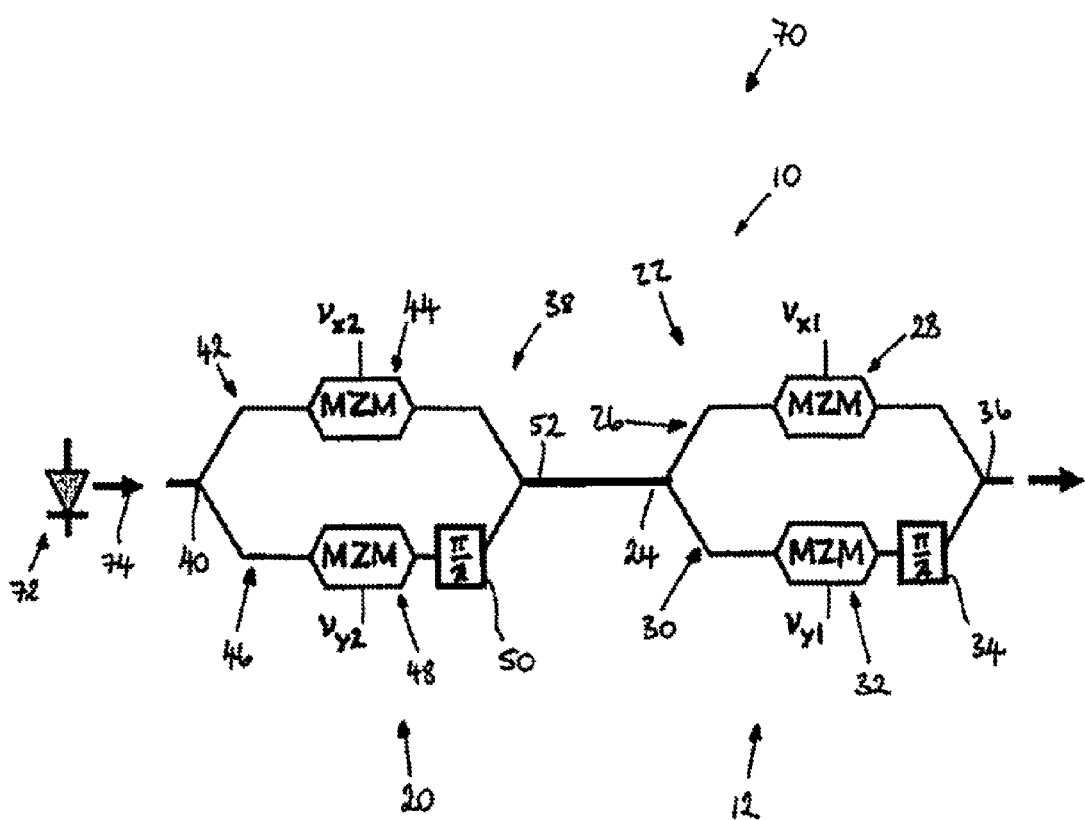
FIG. 9b is a schematic representation of an optical signal transmission apparatus according to a modified form of the fifth embodiment of the invention in which modulation of signals is performed in a reverse order.

Various modifications may be made to the described embodiments without departing from the scope of the present invention, as follows. The I-Q optical modulators of the first embodiment may be reversed, so that the QPSK optical modulation is applied first to the optical signal followed by the 4-QAM optical modulation, similarly for the optical signal transmission apparatus of the fifth embodiment. The I-Q modulator 22 and the phase modulator 62 of the third embodiment of the invention may similarly be reversed, so that the phase modulator first applies the phase modulation to the optical signal followed by the I-Q modulator applying the 4-QAM optical modulation. FIGS. 6b and 9b illustrate such modifications being made to a method and implementation, respectively. It will be appreciated that the I-Q optical modulators may be replaced by a different type of optical modulator operable to apply the desired 4-QAM optical modulation scheme having the constellation diagram shown in FIG. 2.

Although the described embodiments relate to 16-QAM optical modulators and methods of 16-QAM optical modulation, it will be appreciated that the first optical modulation apparatus may be replaced by an optical modulation apparatus operable to apply a different $2^n$-QAM optical modulation scheme, such as a 64-QAM optical modulator and method of modulation. The electrical drive signals to the Mach-Zehnder modulators would be correspondingly changed, for example to 4 level drive signals in the 64-QAM optical modulation example.

16-QAM is among the modulation format candidates for 100 Gb/s transmission into optical fibre. It is a multi-level signal, and is not trivial to generate using conventional optical modulators. Furthermore, quadrant differential encoding is helpful to solve the π/2 phase ambiguity at the receiver but requires high speed digital processing of the transmitted bit sequence. The $2^n$-QAM optical modulator of the present invention enables a 16-QAM modulator to be provided which requires only two-level electrical driving signals, providing an advantage over multi-level drive signals which can be heavily distorted, due to bandwidth limitations and non-linearity of the modulator. In addition, the $2^n$-QAM optical modulator does not require additional processing of the bit sequence in order to apply quadrant differential encoding, which is automatically implemented by the modulator and method of the present invention.

The invention claimed is:

1. A $2^n$-quadrature amplitude modulation optical modulator device comprising:
    a first optical modulation apparatus configured to apply a $2^{n-2}$ amplitude modulation scheme having $2^{n-2}$ constellation points arranged in a first quadrant of its constellation diagram to a received optical signal in order to generate an intermediate optical signal; and
    a second optical modulation apparatus configured to apply a quaternary phase shift keying modulation scheme to the intermediate optical signal received from the first optical modulation apparatus to produce $2^n$ constellation points distributed across the four quadrants of the constellation diagram,
    wherein n is an even number greater than or equal to 2.

2. The $2^n$-quadrature amplitude modulation optical modulator as claimed in claim 1, wherein n is at least 4, the constellation points of the first optical modulation apparatus being arranged in a substantially square constellation.

3. The $2^n$-quadrature amplitude modulation optical modulator as claimed in claim 2, wherein n is 4 or 6.

4. The $2^n$-quadrature amplitude modulation optical modulator as claimed in claim 3, wherein the first optical modulation apparatus comprises:
    an in-phase/quadrature optical modulator comprising an optical input configured to receive an optical signal to be modulated, an in-phase branch comprising a first optical modulator, a quadrature branch comprising a second optical modulator and a π/2 phase shifter, and an optical output; and
    a drive apparatus configured to deliver $\sqrt{(2^{n-2})}$-level electrical drive signals to the first and second optical modulators, such that the in-phase/quadrature optical modulator is operable to apply the $2^{n-2}$ amplitude modulation scheme.

5. The $2^n$-quadrature amplitude modulation optical modulator as claimed in claim 4, wherein the first and second optical modulators comprise Mach-Zehnder modulators.

6. The $2^n$-quadrature amplitude modulation optical modulator as claimed in claim 5, wherein n is 4 and the two-level electrical drive signals comprise approximately 0.39 $V_\pi$ where $V_\pi$ is the switching voltage of the respective Mach-Zehnder modulator, and zero volts.

7. A $2^n$-quadrature amplitude modulation optical modulator device comprising:
   a first optical modulation apparatus configured to apply a quaternary phase shift keying modulation scheme to a received optical signal in order to generate an intermediate optical signal; and
   a second optical modulation apparatus configured to apply a $2^{n-2}$ amplitude modulation scheme to the intermediate optical signal to produce $2^n$ constellation points distributed across the four quadrants of the constellation diagram,
   wherein n is an even number greater than or equal to 2.

8. The $2^n$-quadrature amplitude modulation optical modulator as claimed in claim 7, wherein n is at least 4, the constellation points of the second optical modulation apparatus being arranged in a substantially square constellation.

9. The $2^n$-quadrature amplitude modulation optical modulator as claimed in claim 8, wherein n is 4 or 6.

10. The $2^n$-quadrature amplitude modulation optical modulator as claimed in claim 9, wherein the second optical modulation apparatus comprises:
    an in-phase/quadrature optical modulator comprising an optical input configured to receive an optical signal to be modulated, an in-phase branch comprising a first optical modulator, a quadrature branch comprising a second optical modulator and a π/2 phase shifter, and an optical output; and
    drive apparatus configured to deliver $\sqrt{(2^{n-2})}$-level electrical drive signals to the first and second optical modulators, such that the in-phase/quadrature optical modulator is operable to apply the $2^{n-2}$ amplitude modulation scheme.

11. The $2^n$-quadrature amplitude modulation optical modulator as claimed in claim 10, wherein the first and second optical modulators comprise Mach-Zehnder modulators.

12. The $2^n$-quadrature amplitude modulation optical modulator as claimed in claim 11, wherein n is 4 and the two-level electrical drive signals comprise approximately 0.39 $V_\pi$ where $V_\pi$ is the switching voltage of the respective Mach-Zehnder modulator, and zero volts.

13. An optical signal transmission apparatus comprising:
    an optical source having an optical output and being operable to generate an optical signal; and
    a $2^n$-quadrature amplitude modulation optical modulator; and
    the optical output of the optical source being coupled to a first optical modulation apparatus of the $2^n$-quadrature amplitude modulation optical modulator,
    wherein the $2^n$-quadrature amplitude modulation optical modulator device comprises:
      the first optical modulation apparatus configured to apply a $2^{n-2}$ amplitude modulation scheme having $2^{n-2}$ constellation points arranged in a first quadrant of its constellation diagram to a received optical signal in order to generate an intermediate optical signal,
      a second optical modulation apparatus configured to apply a quaternary phase shift keying modulation scheme to the intermediate optical signal received from the first optical modulation apparatus to produce $2^n$ constellation points distributed across the four quadrants of the constellation diagram,
    wherein n is an even number greater than or equal to 2.

14. An optical signal transmission apparatus comprising:
    an optical source having an optical output and being operable to generate an optical signal; and
    a $2^n$-quadrature amplitude modulation optical modulator;
    the optical output of the optical source being coupled to a first optical modulation apparatus of the $2^n$-quadrature amplitude modulation optical modulator,
    wherein the $2^n$-quadrature amplitude modulation optical modulator device comprises:
      the first optical modulation apparatus configured to apply a quaternary phase shift keying modulation scheme to a received optical signal in order to generate an intermediate optical signal; and
    a second optical modulation apparatus configured to apply a $2^{n-2}$ amplitude modulation scheme to the intermediate optical signal to produce $2^n$ constellation points distributed across the four quadrants of the constellation diagram,
    wherein n is an even number greater than or equal to 2.

* * * * *